(12) United States Patent
Sikkink et al.

(10) Patent No.: US 11,032,397 B2
(45) Date of Patent: Jun. 8, 2021

(54) METHOD AND SYSTEM FOR HIGH SPEED DATA LINKS

(71) Applicant: HEWLETT PACKARD ENTERPRISE DEVELOPMENT LP, Houston, TX (US)

(72) Inventors: Mark Ronald Sikkink, Chippewa Falls, WI (US); Randal Steven Passint, Chippewa Falls, WI (US); Joseph Martin Placek, Chippewa Falls, WI (US); Russell Leonard Nicol, Eau Claire, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1280 days.

(21) Appl. No.: 14/742,007

(22) Filed: Jun. 17, 2015

(65) Prior Publication Data

US 2016/0373557 A1    Dec. 22, 2016

(51) Int. Cl.
*H04L 29/06* (2006.01)
*H04L 29/08* (2006.01)
*H04L 1/00* (2006.01)

(52) U.S. Cl.
CPC .............. *H04L 69/08* (2013.01); *H04L 1/007* (2013.01); *H04L 1/0041* (2013.01); *H04L 1/0061* (2013.01); *H04L 1/0072* (2013.01); *H04L 1/0083* (2013.01); *H04L 69/22* (2013.01); *H04L 69/324* (2013.01); *H04L 1/0003* (2013.01)

(58) Field of Classification Search
None
See application file for complete search history.

(56) References Cited

U.S. PATENT DOCUMENTS

| 8,856,379 | B2 | 10/2014 | Boucher et al. |
| 2015/0055649 | A1 | 2/2015 | DeCusatis et al. |
| 2015/0180790 | A1* | 6/2015 | Rimmer ................. H04L 47/39 370/368 |
| 2015/0378737 | A1* | 12/2015 | Debbage ............. G06F 12/0875 712/225 |

OTHER PUBLICATIONS

Adiga et al., "An Overview of the BlueGene/L Supercomputer," pp. 1-22, Sep. 10, 2002, Supercomputing, ACM/IEEE 2002 Conference, Nov. 16-22, 2002.
Taboada et al., "F-MPJ: scalable Java message-passing communications on parallel systems," The Journal of Supercomputing, Apr. 2012, vol. 60, Issue 1, pp. 117-140, but previously published online Feb. 27, 2009.

* cited by examiner

*Primary Examiner* — Yemane Mesfin
*Assistant Examiner* — Jeff Banthrongsack
(74) *Attorney, Agent, or Firm* — Hewlett Packard Enterprise Patent Department

(57) ABSTRACT

Various embodiments improve the operation of computers by providing methods of transmitting data with low latency and high bandwidth. Data may be transmitted in a packet composed of data flits, the data flits having at least two different formats configured to implement different communication protocols. In some embodiments, a given flit may be transmitted using two different modulation methods, with a first part of the flit transmitted using a first modulation method, such as a binary method, and a second part of the flit using a higher-order modulation method.

22 Claims, 14 Drawing Sheets

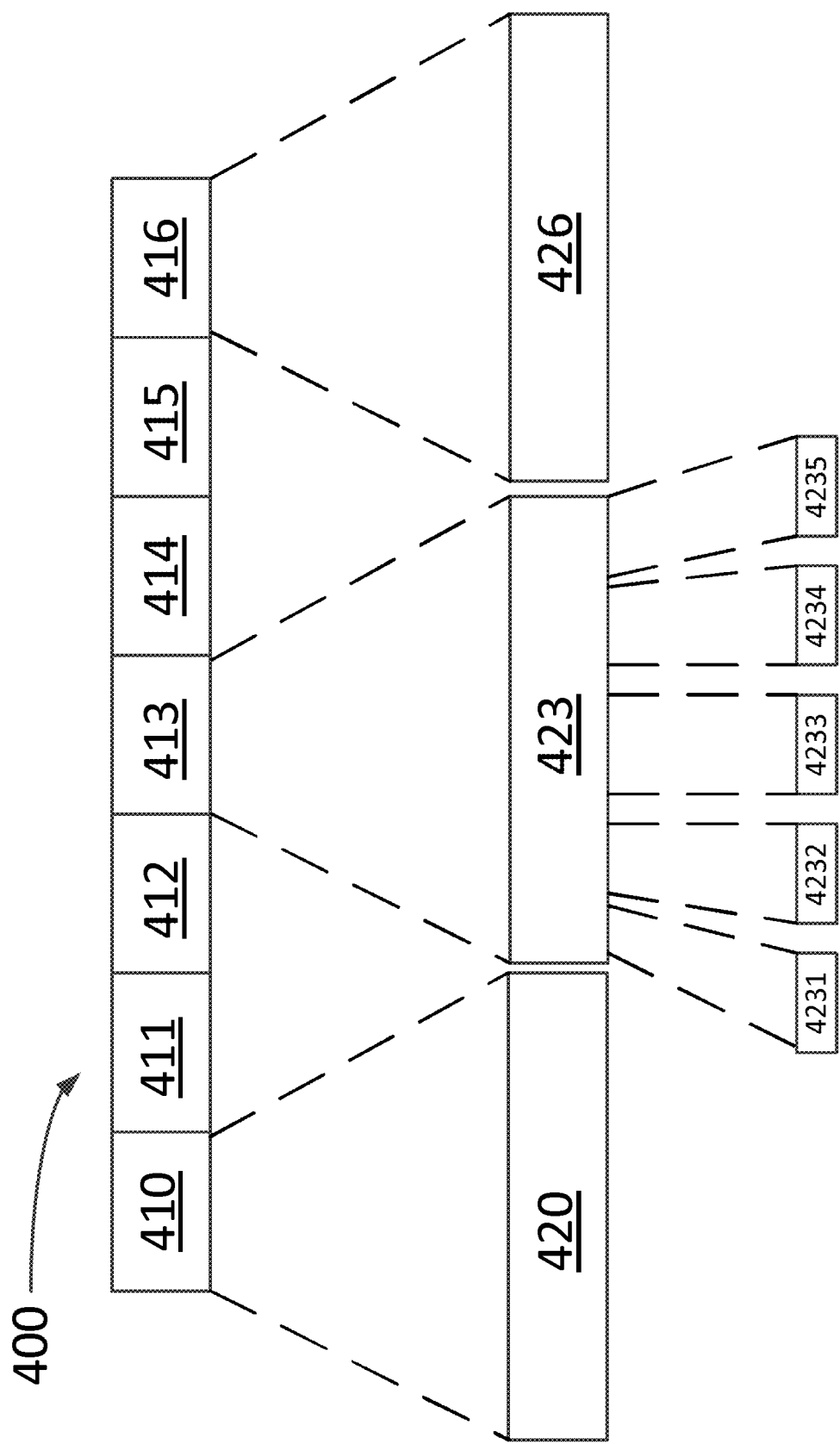

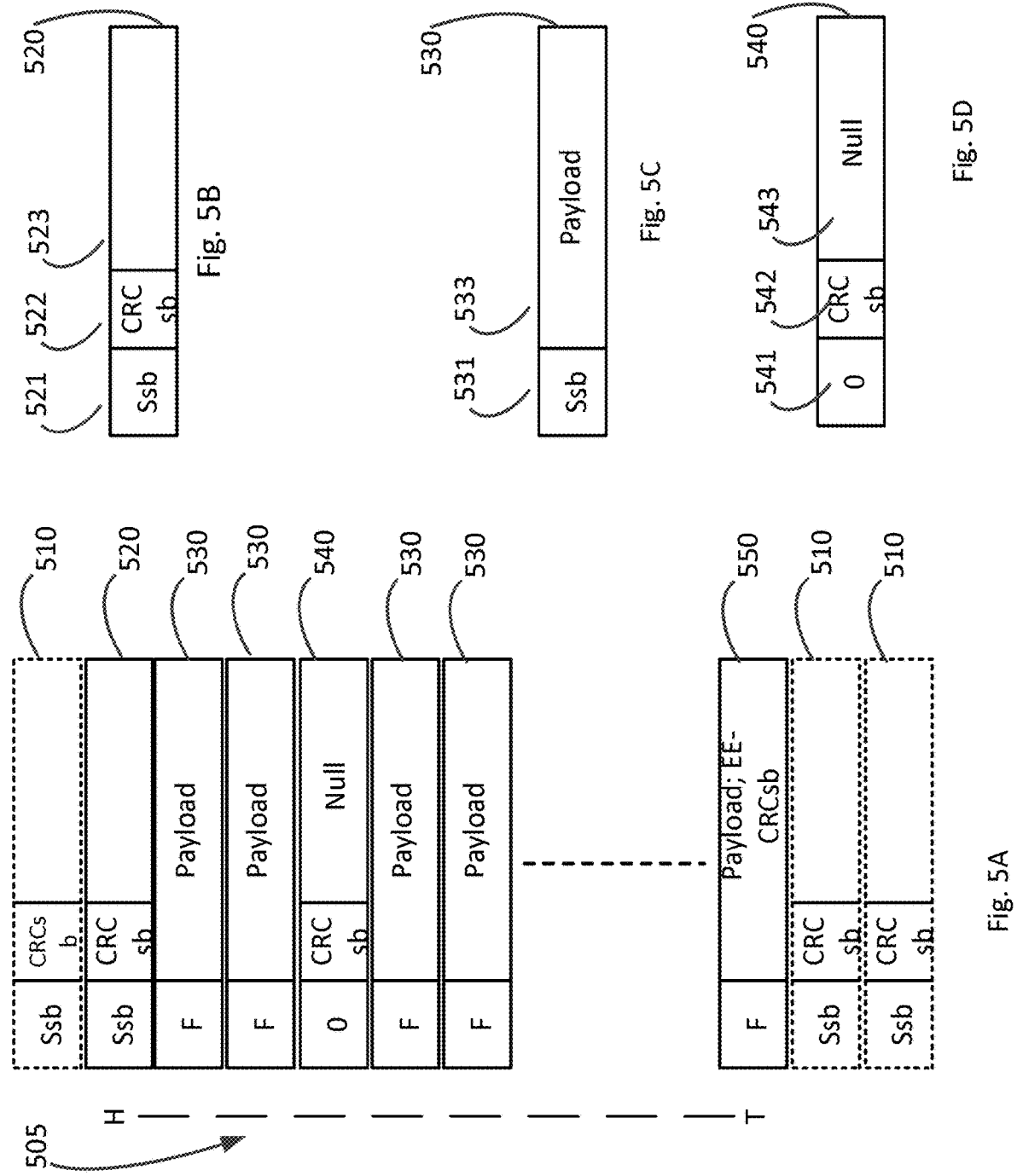

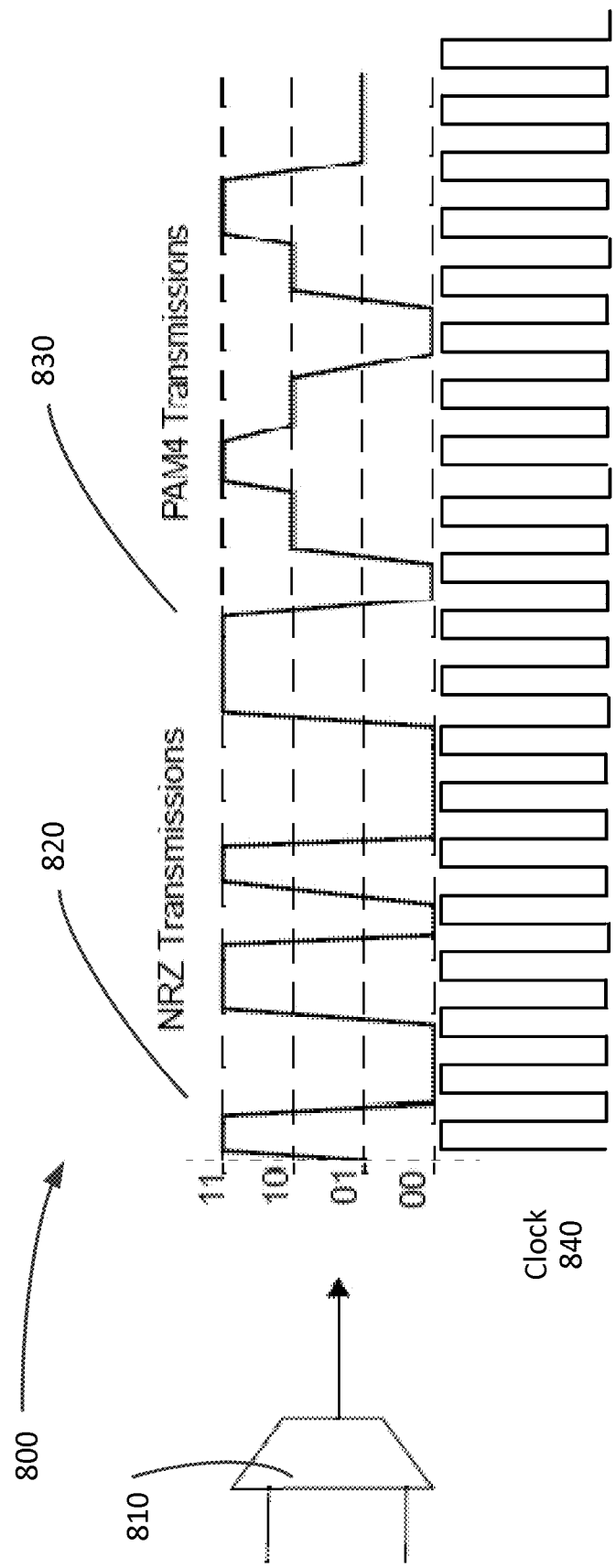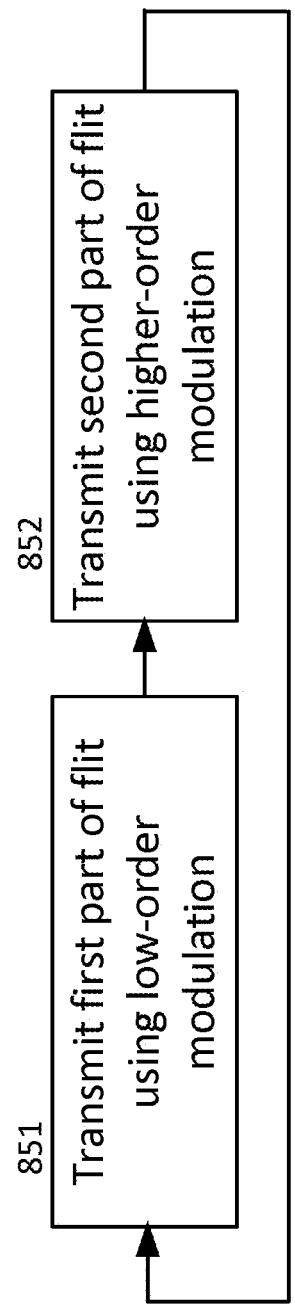

# METHOD AND SYSTEM FOR HIGH SPEED DATA LINKS

TECHNICAL FIELD

The present invention relates to high performance computers, and more particularly to data communication within high performance computers.

BACKGROUND ART

Existing network protocols are not well suited or optimized for transporting both short and long messages. Prior art network protocols are constructed to support either short at the expense of long messages, or long messages at the expense of short message. Protocols that excel with short messages focus on low latency techniques, but sacrifice efficiency and effectively bandwidth. Protocols that excel with long messages focus on efficiency and bandwidth, but sacrifice latency.

SUMMARY OF THE EMBODIMENTS

Various embodiments improve the operation of computers by providing efficient and fast methods of transmitting data. In some embodiments, data may be sent from one part of a high performance computer to another part of the same computer, or to a different computer, with both low latency and high bandwidth. In some embodiments, the transmission protocol may dynamically adapt to the data being transmitted. Hardware at the transmitter processes the data to be transmitted into an appropriate format and sends the formatted data over a communications link, and different hardware at a receiver processes that formatted data to assemble the data. Errors in data transmission may be detected at the link level, or from end-to-end (i.e., transmitter to receiver).

A first embodiment defines a method of transmitting a large data block as a packet in a burst mode, from a transmitter in a high-performance computer to a receiver over a communications channel within the high-performance computer. The method includes the steps of segmenting the data block into a plurality smaller sub-blocks and/or micro-blocks (e.g., at the transmitter), and generating a packet composed of a plurality of flits. The flits that make-up the packet do not all have the same format. Rather, the flits that make-up the packet have formats configured to implement different communication protocols. For example, the packet includes (i) a header flit having a low-latency format configured for low-latency transmission over the fabric. The header flit format may have a header sideband field storing meta data about the flit, and a sideband CRC field having a CRC value corresponding to the meta data. The same packet also has (ii) a plurality of efficient (or "bandwidth" or "freight") flits, each efficient flit having an efficient flit format that is different than the header flit format, and configured to efficiently move data across the fabric. The efficient flit format may have a payload field storing a micro-block, and a freight sideband field storing meta data about the payload. Also, the same packet has (iii) a tail flit having a payload field and an end-to-end CRC field, the end-to-end CRC field storing CRC data for the packet.

The method then includes transmitting the plurality of flits from the transmitter to the receiver in a contiguous stream, and receiving each of the plurality of flits at the receiver. The contiguous stream runs two protocols simultaneously over one physical fabric, the first protocol being a link-level protocol configured for low-latency messaging, and a the second protocol being an end-to-end protocol configured for high bandwidth. At the receiver, the method removes the micro-blocks from the payload fields the plurality of flits and reassembles the data block from the micro-blocks. In some embodiments, all of the flits that compose a packet are sent over a single virtual channel.

Some embodiments include checking the integrity of the packet and/or flits during transmission and/or after receipt of the flits at the receiver. For example, in some embodiments, the method includes checking flit integrity of at least one flit at an intermediate point in the communications channel between the transmitter and the receiver, and requesting that the transmitter resend the flit if the flit integrity is not verified.

In another embodiment, receiving each of the plurality of flits at the receiver includes receiving all of the flits at the receiver prior to checking the integrity of the packet; and then checking the integrity of the packet. If the integrity of the packet is not confirmed, then the method may include requesting a replay of the entire packet from the transmitter.

Various burst mode embodiments may yield high packet efficiency while simultaneously providing low packet latency. For example, in some embodiments, the packet has a packet efficiency of greater than ninety percent, while in some embodiments the packet has a packet efficiency of greater than ninety five percent.

Another embodiment allows other data to be interleaved with the flits of a packet. A method of transmitting a data block in an interleaving mode, from a transmitter in a high-performance computer to a receiver within the high-performance computer over a communications channel within the high-performance computer, includes—at the transmitter—segmenting the data block into a plurality smaller sub-blocks and/or micro-blocks, and generating a packet composed of a plurality of packet flits. The flits do not all have the same format. Rather, the flits that make-up the packet have formats configured to implement different communication protocols. For example, the packet includes (i) a header flit having a low-latency format, which may include a header sideband field storing meta data about the data block, a header sideband CRC field having CRC data corresponding to the meta data, a payload field storing one of the micro-blocks, and a header payload CRC field having CRC data corresponding to the data in the payload field; (ii) a plurality of freight (or "efficient" or "bandwidth") flits, each freight flit may have a payload field storing one of the micro-blocks, a freight sideband field storing meta data about the data micro-block in the payload field, and a freight sideband CRC field having CRC data corresponding to the meta data; and (iii) a tail flit, which may have a tail payload field and an end-to-end CRC field, the end-to-end CRC field storing CRC data for the data block.

The method then includes transmitting the plurality of packet flits from the transmitter to the receiver, and receiving the plurality of packet flits at the receiver. The transmission of the packet runs two protocols simultaneously over one physical fabric, the first protocol being a link-level protocol configured for low-latency messaging, and a the second protocol being an end-to-end protocol configured for high bandwidth. In some embodiments, all of the flits that compose a packet are sent over a single virtual channel. At the receiver, the method includes removing the micro-blocks from the payload fields of the flits and reassembling the data block from the micro-blocks.

In an interleaving mode, the step of transmitting the plurality of packet flits from the transmitter to the receiver includes interleaving the packet flits with additional data flits, the additional data flits not having data from the data block; and transmitting the plurality of additional data flits interleaved with the packet flits.

Various interleaving mode embodiments may simultaneously yield high packet efficiency and low-latency. For example, in some embodiments, the packet has a packet efficiency of greater than ninety percent, while in some embodiments the packet has a packet efficiency of greater than ninety five percent.

In another embodiment, a system for transmitting data over a virtual channel in a manner having both low latency and high efficiency includes a data processor configured to generate a packet composed of a plurality of flits, including at least one low-latency flit configured for low latency transmission over the communications channel, and a plurality of bandwidth flits, each bandwidth flit configured for high bandwidth throughput; a transmitter configured to transmit the plurality of flits via a communications channel; and a destination receiver configured to receive the plurality of flits and validate the integrity of the packet as received at the receiver. In such embodiments, the transmission of the packet runs two protocols simultaneously over one physical fabric, the first protocol being a link-level protocol configured for low-latency messaging, and a second protocol being an end-to-end protocol configured for high bandwidth.

The communication channel may include at least one intermediate point through which flits travel on the journey from transmitter to final destination. The intermediate point has an intermediate receiver configured to validate the integrity of some, but not all, of the flits of the packet that pass through such intermediate point.

In some embodiments, the transmitter is configured to transmit all of the flits of the packet in a contiguous burst.

In other embodiments, the transmitter is configured to transmit all of the flits of the packet interleaved with other flits that are not part of the packet.

Various methods and systems may transmit a flit, such as a bandwidth flit for example, using two different modulation methods different bits of the flit. For example, transmitting a bandwidth flit may include transmitting bits of a first part of the flit using a binary modulation format (such as NRZ for example), and transmitting the remaining bits of the flit using a higher-order modulation format (such as PAM4 for example).

BRIEF DESCRIPTION OF THE DRAWINGS

The foregoing features of embodiments will be more readily understood by reference to the following detailed description, taken with reference to the accompanying drawings, in which:

FIG. 4A schematically illustrates a data block to be transmitted, and several data packets and flits;

FIGS. 5A-5G schematically illustrate features of an embodiment of a method for transmitting data in a burst mode;

FIG. 8A and FIG. 8B schematically illustrate a dual-mode modulation protocol.

DETAILED DESCRIPTION OF SPECIFIC EMBODIMENTS

Figure 1:
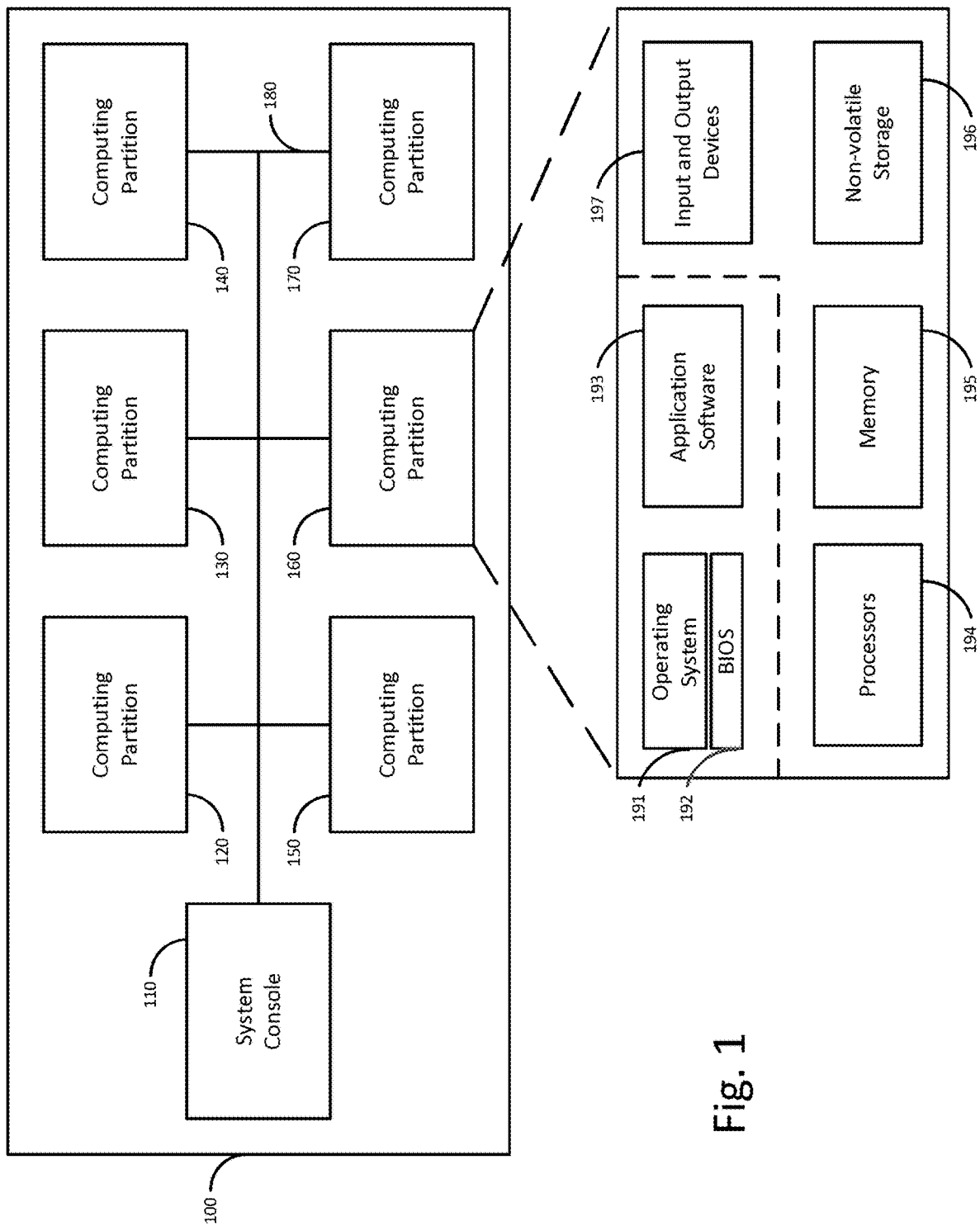
FIG. 1 schematically illustrates a logical view of an HPC system in accordance with one embodiment of the present invention.

Various embodiments improve the operation of computers by providing efficient and fast methods of transmitting data. In some embodiments, data may be sent from one part of a high performance computer to another part of the same computer, or to a different computer, with both low latency (fast) and high bandwidth (efficient). In some embodiments, the transmission protocol may dynamically adapt to the data being transmitted. Hardware at the originator of the data processes the data into a packet composed of at least two different varieties of flits. The originator sends the flits over a communications link, which link may include several intermediate points. Each intermediate point forwards the flits to a subsequent intermediate point, until the flits arrive at their destination (terminus). Different hardware at the terminus receiver processes received flits to reassemble the original data. Errors in data transmission may be detected at the link level, or from end-to-end (i.e., originator to terminus).

Definitions. As used in this description and the accompanying claims, the following terms shall have the meanings indicated, unless the context otherwise requires:

The term "sideband" (or "side-band" or "Ssb") means a data field within a flit that contains meta data about the flit.

The term "control data" refers to meta data about a flit and/or its payload. For example, control data may identify the type of flit, and/or the number of flits in a packet, and/or the originator of a packet and/or the destination of a packet, to name but a few examples.

The term "CRC-sb" (or "crc-sb," or "crcsb") means a cyclic redundancy check value for sideband data in a sideband data field.

The term "CRC-pl" (or CRCpl) means a cyclic redundancy check value for payload data.

A "contiguous stream" (or "contiguous burst") of flits refers to a sequence of flits that define a packet, which flits are transmitted without another flit (i.e., a flit that is not part of the packet) interleaved among the sequence of flits.

A "flit" (or "flow-control-unit") is a micro-packet of information sent across a fabric. In the OSI model context, a packet may be formed at level 2.

A "packet" is a set of at least two flits. In the OSI model context, a packet may be formed at level 3.

The term "packet efficiency" refers to the ratio of the amount of payload data transmitted to the total amount of data transmitted. For example, if a packet has one flit of overhead data (e.g., header data) for every four flits of payload data, the packet has a packet efficiency of 4/(1+4)=4/5=80 percent. Similarly, if a packet has one flit of overhead data (e.g., header data) for every nineteen flits of payload data, the packet has a packet efficiency of 19/(1+19)=19/20=95 percent.

The term "bit efficiency" refers to the ratio of the number of payload bits in a packet to the total number of bits in the packet, such that bit efficiency would be defined as the total number of bits minus the number of overhead bits, divided by the total number of bits, times 100%. For example, if a the flits of a packet total 1000 bits, of which 120 are overhead (e.g., sideband data; CRC values; control data, for example) and 880 are payload data, then the bit efficiency would be the total number of bits (1000) minus the number of overhead bits (120), divided by the total number of bits (1000)×100%, which equals (1000-120)×100%/1000, or 8800%/1000=88%.

A "virtual channel" is a logical entity that allows multiple logical message flows through a fabric.

Overview of System Architecture

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
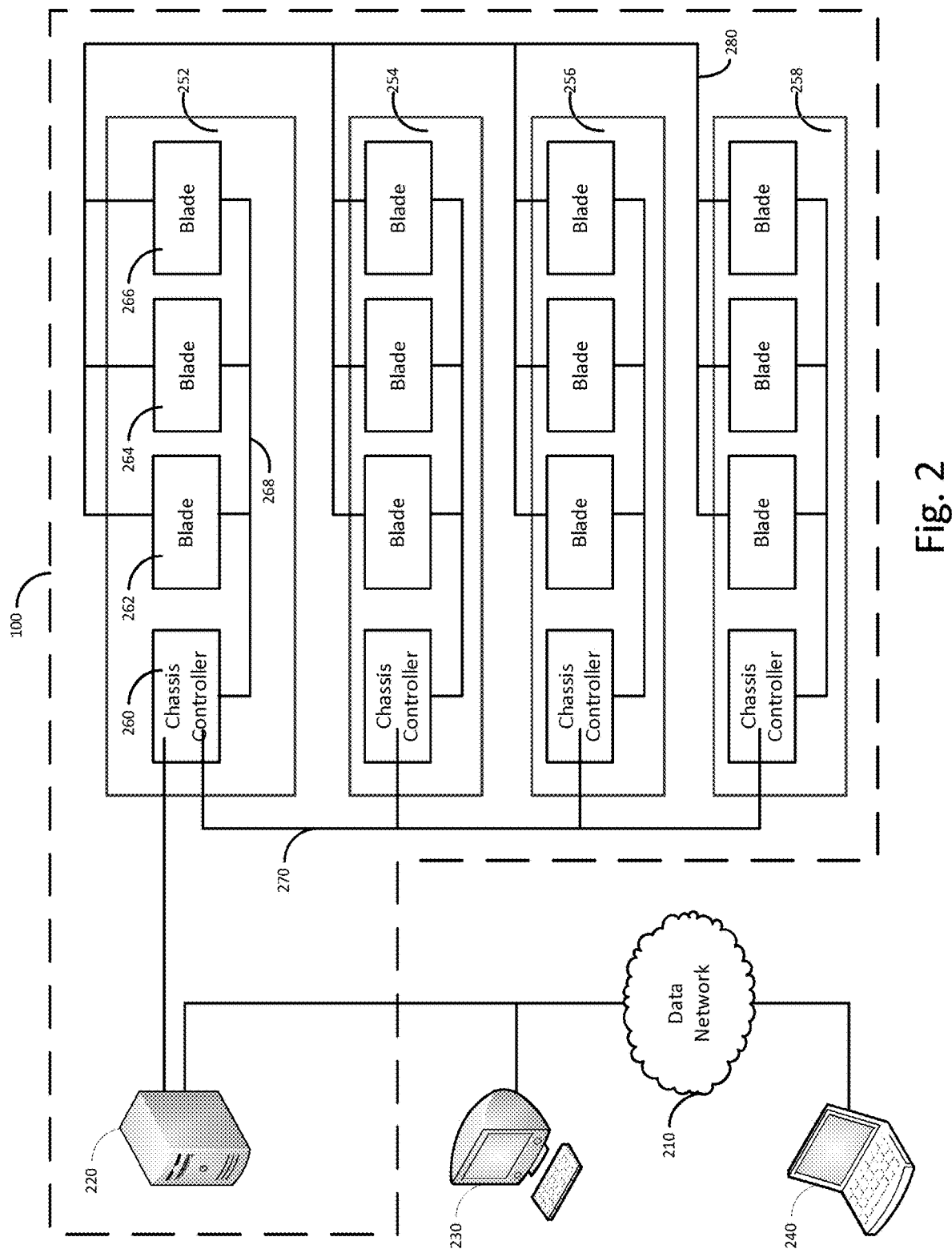
FIG. 2 schematically illustrates a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which, may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
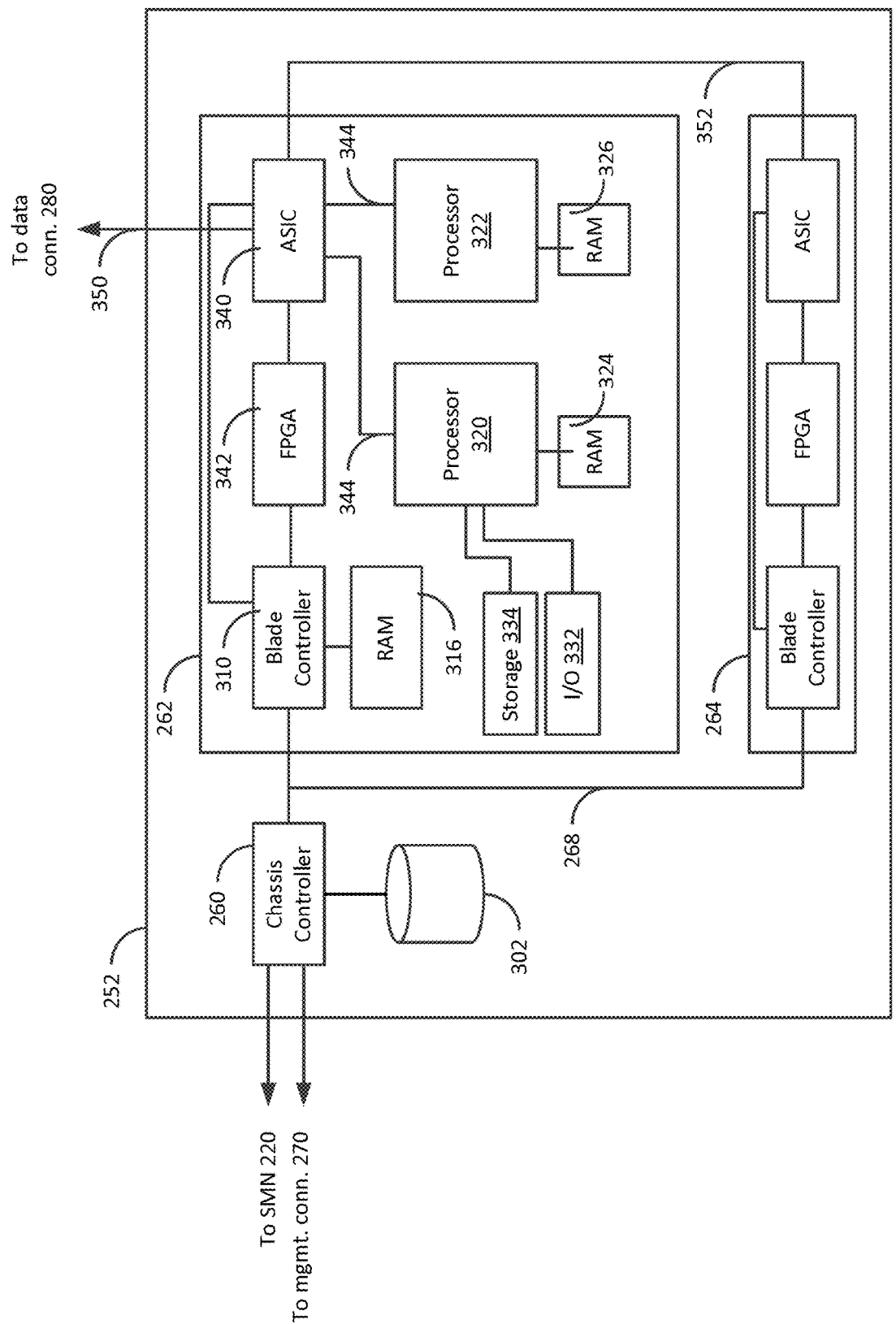
FIG. 3 schematically illustrates details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 311 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HP670C system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Data Communication

FIG. 4A schematically illustrates a block of data (or "data block") 400 to be transmitted from an originator to a terminus. Various embodiments may segment the data block 400 into smaller sub-blocks (410-416, in this example), and each sub-block may be further segmented into micro-blocks 4231-4235. Each sub-block is then transmitted from the originator to the terminus in a packet (e.g., 423) composed of a number of flits, as described further below Each of the sub-blocks (410-416) within the data block 400 is similarly segmented into micro-blocks, but some of those micro-blocks are omitted from FIG. 4A to avoid cluttering the drawing.

Figure 4B:
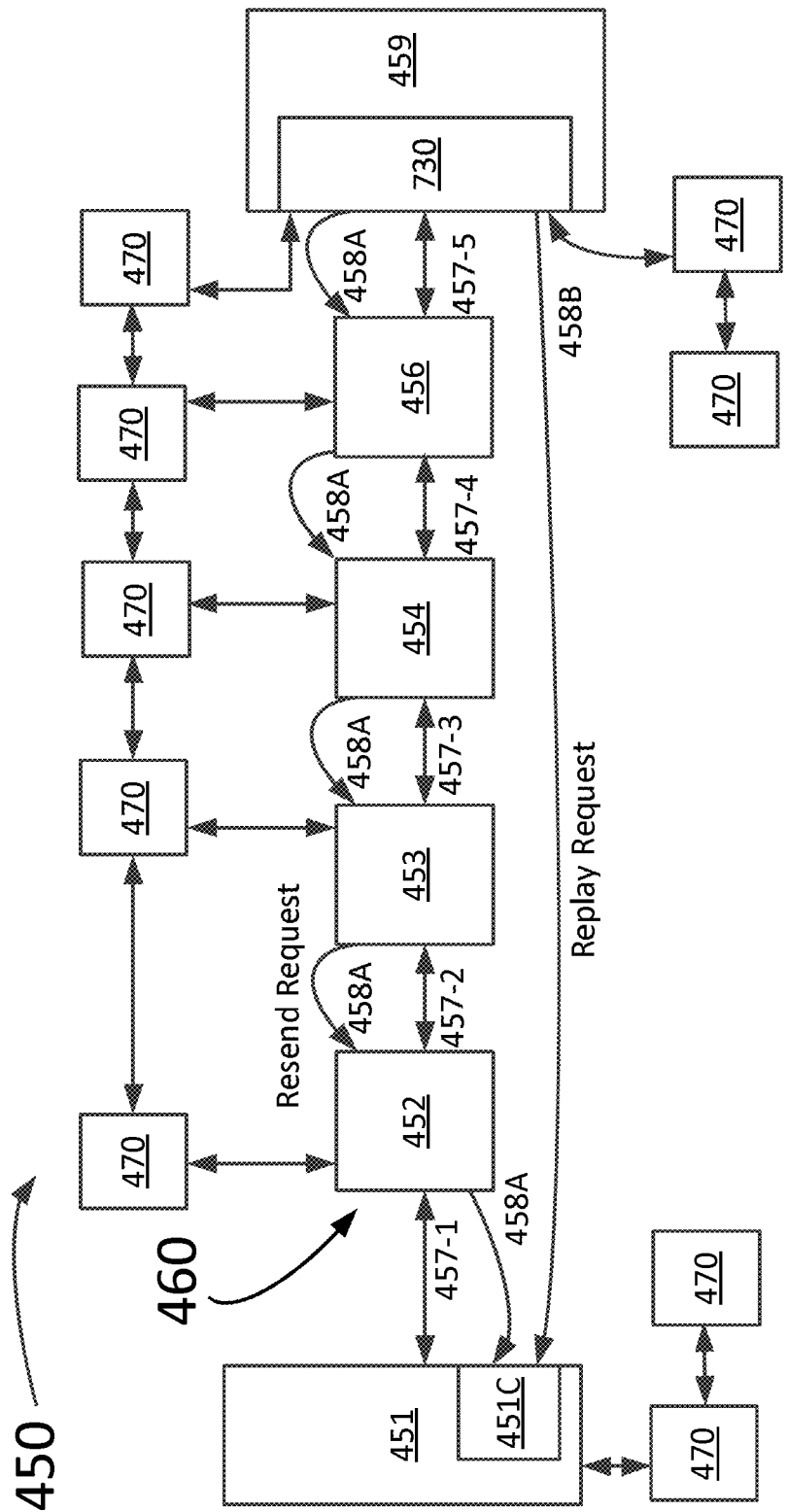
FIG. 4B schematically illustrates a fabric across which flits and packets may be transmitted.

Generally, the flits may be transmitted across a transmission medium or fabric, along with other data that is not part of the data block 400. Collectively, the flits compose a packet that carries the sub-block of data. An illustrative fabric 450 is schematically illustrated in FIG. 4B, and includes a message originator 451, which includes a transmitter, circuitry for preparing a message, and a control interface (e.g., 451C). The fabric 450 also includes a terminus 459, which in this example is the destination of a packet sent by the originator 451.

Figure 7A:
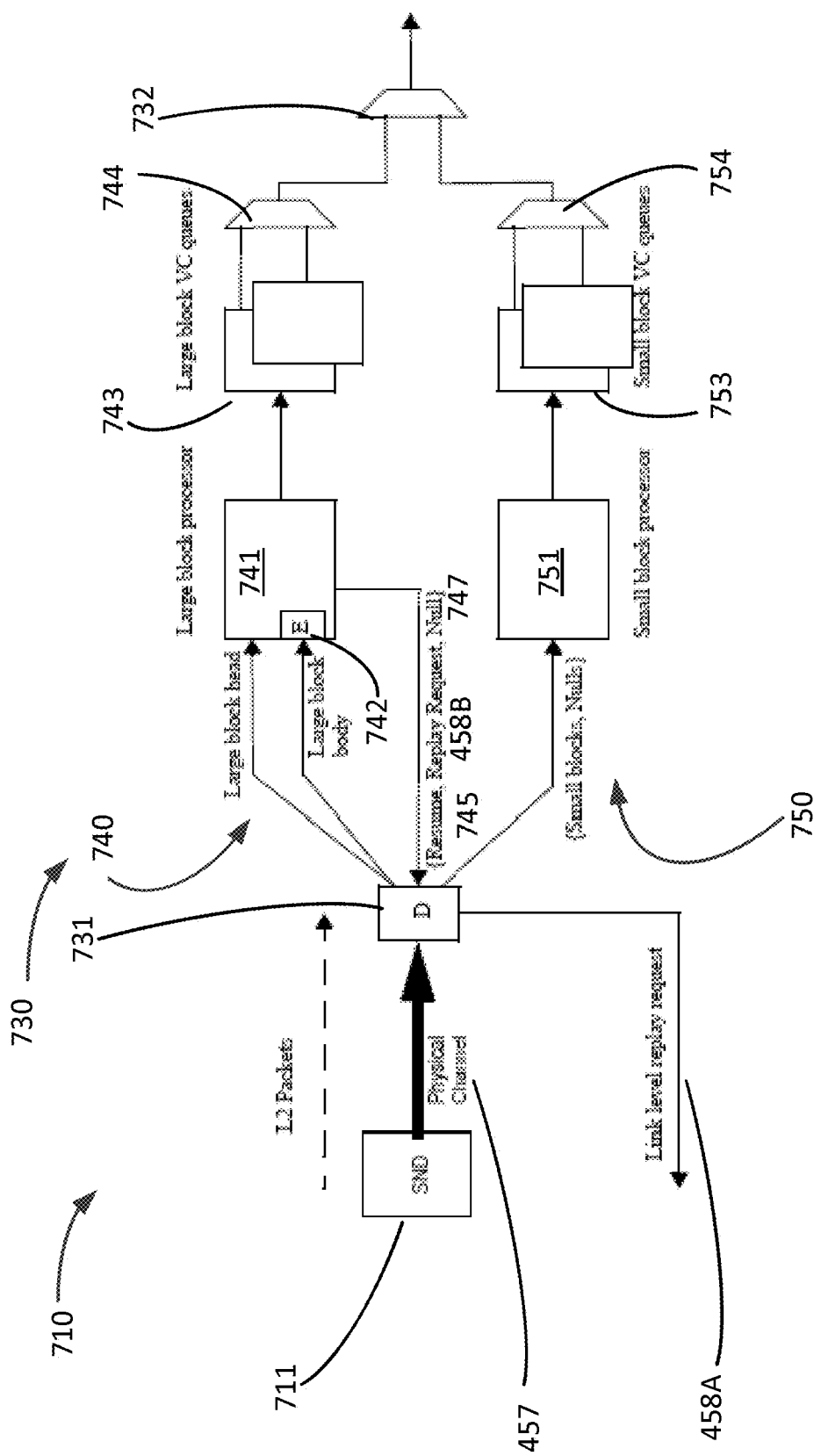
FIG. 7A schematically illustrates a transmission system transmitting data in a burst mode.
Figure 7B:
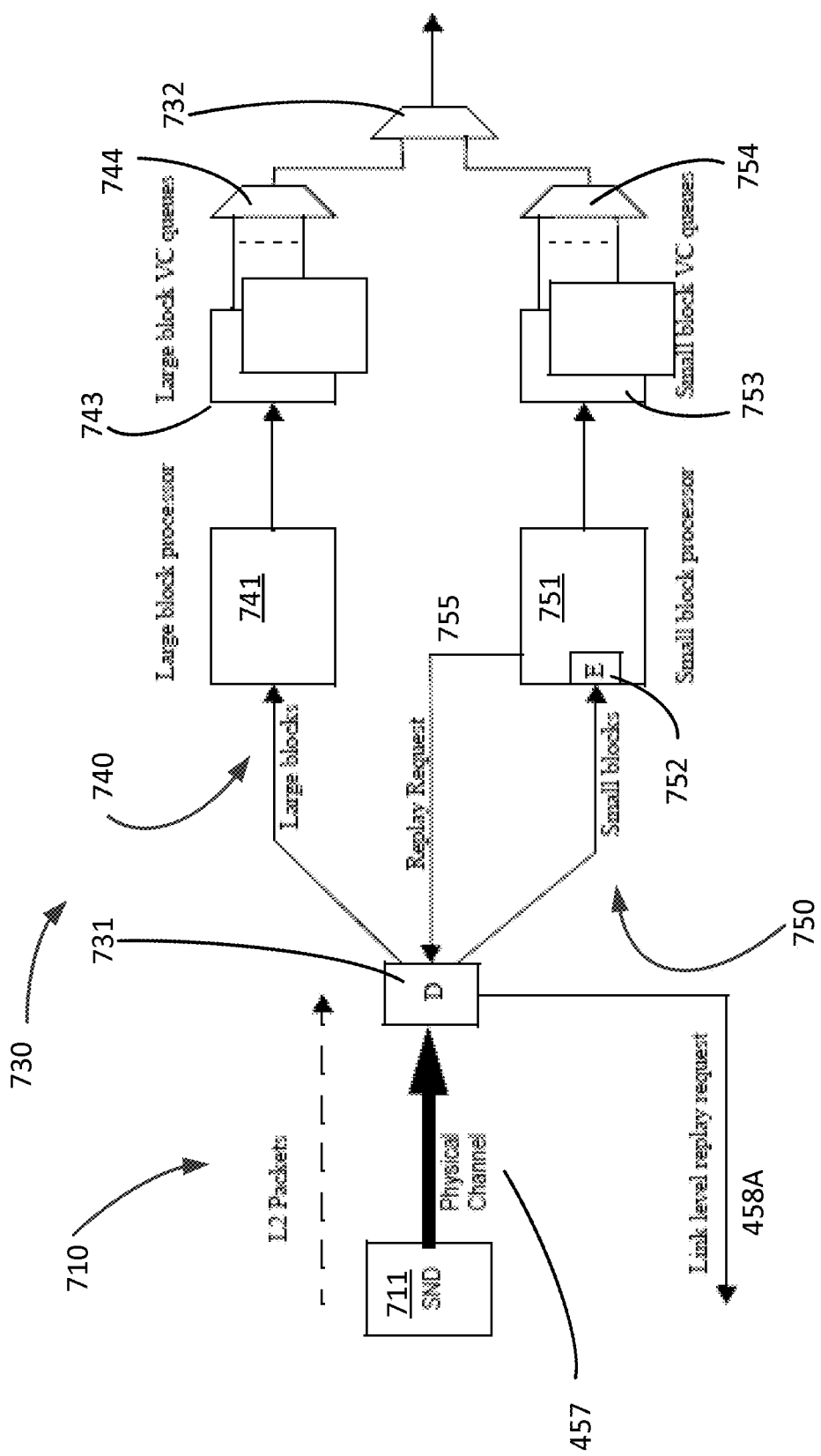
FIG. 7B schematically illustrates a transmission system transmitting data in an interleaved mode.

The fabric 450 also includes a number of intermediate points through which a flit or packet may travel on its journey from the originator 451 to the terminus 459. For example, FIG. 4B schematically illustrates several intermediate points 452-456. Each of the intermediate points 452-456 has a transmitter (e.g., 710 in FIG. 7A) and a receiver (e.g., 730 in FIG. 7A; FIG. 7B), and is connected to at least one of the other intermediate points 452-456 by a link 457 (e.g., in this embodiment, links 457-2; 457-3; 457-4; 457-5, respectively), though which information may be transferred. Indeed, in some embodiments, any of of the intermediate points 452-456 could be a part of a different virtual channel within fabric 450, or could even be a source of end-point of such a different virtual channel, while still serving as an intermediate point in the virtual channel 460. Flits carrying micro-blocks (e.g., 4231, etc.) may travel individually from the originator 451 to the terminus 459 by making a series of hops (each across a link, e.g., 457-1) from the originator 451 to an intermediate point (e.g., 452) and making subsequent hops using other links (457-2; 457-3; 457-4; 457-5) to other intermediate points (453; 454; and 456), and eventually from an intermediate point (e.g., 456) to the terminus 459. The intermediate points 452-456 may be described as composing a virtual channel through the fabric 450, over which a flits of a packet passes in traveling from the originator 451 to the terminus 459. The originator 451 and terminus 459 are part of the fabric, and are end points in the virtual channel, but may be intermediate points in other virtual channels. As shown in FIG. 4B, the fabric 450 includes a number of other points 470, other than the points that compose the virtual channel 460. A different virtual channel could be configured from a subset such other points 470, and could optionally include some or all of the points 452, 459, and/or 452-456.

In some embodiments, a communications a link (e.g., 457-1, etc.) may be a physical medium, such as a data cable, or a trace on a printed circuit board, or conductors within a semiconductor, or optical fibers. In some embodiments, one or more of the links (e.g., 457-1, etc.) could even be a wireless connection. To illustrate this step in an Open Systems Interconnection model context, the communications link would interface level 1, for example.

The terminus 459, and each intermediate point (452-456), may evaluate each flit and/or each packet that it receives, and may request that a flit or even an entire packet be resent. For example, if intermediate point 453 receives a corrupted flit from intermediate point 452 across link 457-2, the intermediate point 453 may request that the flit be resent by intermediate point 452 by sending a "resend" request 458A across link 457-2. Similarly, if terminus 459 receives a corrupted flit at its receiver 730, it may request that the flit be resent by intermediate point 456, by sending a "resend" request 458A across link 457-5 to intermediate point 456. Alternately, if terminus 459 receives a corrupted flit or packet, terminus 459 may request that the entire packet be re-sent across the fabric 450 from the originator 451 to the terminus 459 by sending a "replay" message 458B to the originator 451 (e.g., across the links 457-5-457-1).

The originator 451 and each intermediate point 452-456 has a transmitter to send flits across the fabric 450, and in this case along the virtual channel 460. Each intermediate point 452-456, and the terminus 459, may have a receiver with multiple channels, each channel configured to process different kinds of transmissions. For example, receiver 730 as schematically illustrated in FIGS. 7A and 7B has two channels: a "large block" channel 740, and a "small block" channel 750, as described more fully below. Each channel 740; 750 processes incoming flits from a transmitter 710 and stores the received flits in either one of a number of large block virtual channel ("VC") queues 743, or one of a number of small block virtual channel ("VC") queues 753. From there, the contents of a large block virtual channel queue 743 may be selected by multiplexer 744, and forwarded on through multiplexer 732, and/or the contents of a small block VC queue 753 may be selected by multiplexer 754, and forwarded on through multiplexer 732 to a subsequent intermediate point (e.g., 453, 454, or 456) or to the terminus 459.

Various embodiments may be implemented within the Open Systems Interconnection model (or "OSI model"), although that is not a requirement of any embodiment. For example, various embodiments may receive data from level 3 of the OSI model, and format, transmit, and receive data using level 2 and level 1 of the OSI model. However, references to any layer within the OSI model is for illustrative purposes only.

Burst Mode

In one embodiment, packet (e.g. 423) is sent as a contiguous stream of several flits, in a burst mode. The packet includes flits having at least two different formats. The contiguous stream runs two protocols simultaneously over one physical fabric, the first protocol being a link-level protocol configured for low-latency messaging, and a the second protocol being an end-to-end protocol configured for high bandwidth. Aspects of this embodiment are schematically illustrated in FIGS. 5A-5G, and may be understood in the context of a transmitter, receiver, and communications link as schematically illustrated in FIG. 7A.

Generally, in this embodiment, low latency flits 520 have a format ("low-latency format") that is different from the format of other flits in the packet within the burst 505. As schematically illustrated in FIG. 5B, low latency flits 520 have sideband (Ssb) fields 521 and CRC fields 522 that carry Ssb data and CRC values, respectively. The length of a low-latency flit 520 may be determined by the system designer, so the following are merely examples, and do not limit the disclosure or claims. In this embodiment, the low-latency (520) flit has a total length of 152 bits: the Ssb field (521) occupies 8 bits, the CRC field (522) occupies 16 bits, and the payload field (523) occupies 128 bits.

A low latency flit 520 with a specific encoding marks the beginning of a contiguous burst 505, and a tail flit 550 marks the end of the contiguous burst 505.

Other types of flits within the burst 505 may be high bandwidth flits, which may be referred to as "bandwidth" flits, "efficient" flits, and "null" flits. Bandwidth flits and null flits have formats that are different from each other, and different from the low latency flit 520, as described in more detail below.

As schematically illustrated in FIG. 5C, efficient flits (530) have a format ("bandwidth format"), as described further below. The length of an efficient flit 530 may be determined by the system designer, so the following are merely examples, and do not limit the disclosure or claims. In this embodiment, the efficient flit (530) has a total length of 152 bits: the Ssb field (531) occupies 4 bits, and the payload field (533) occupies 148 bits. A tail flit 550 is an efficient flit, and has the same format described above for flit 530.

As schematically illustrated in FIG. 5D, null flits (540) have flit payloads (in payload field 543) that carry a control field with two encodings separated by sufficient Hamming distance. The second encoding is used to insert nulls (e.g. as schematically illustrated in flit 540) when no data is available for transmission. The length of a null flit 540 may be determined by the system designer, so the following are merely examples, and do not limit the disclosure or claims. In this embodiment, the null flit (540) has a total length of 152 bits: the Ssb field (541) occupies 4 bits, the CRC field (542) occupies 16 bits, and the payload field (543) occupies 132 bits.

In this embodiment, control field errors are replayed at the link level. User data (e.g., payload data 533) errors are replayed end-to-end.

Interleaving other virtual channels (e.g., 510) within a large block burst 505 (i.e., the sequence of that include header flit 520, tail flit 550, and all flits 530 and 540 in-between flits 520 and 550) is not allowed. Interleaving outside of large block bursts is allowed, for example as schematically illustrated by flits 510 before flit 520 and after flit 550, which flits fall, in time, between the contiguous burst 505 and any preceding or subsequent burst.

Figure 5E:
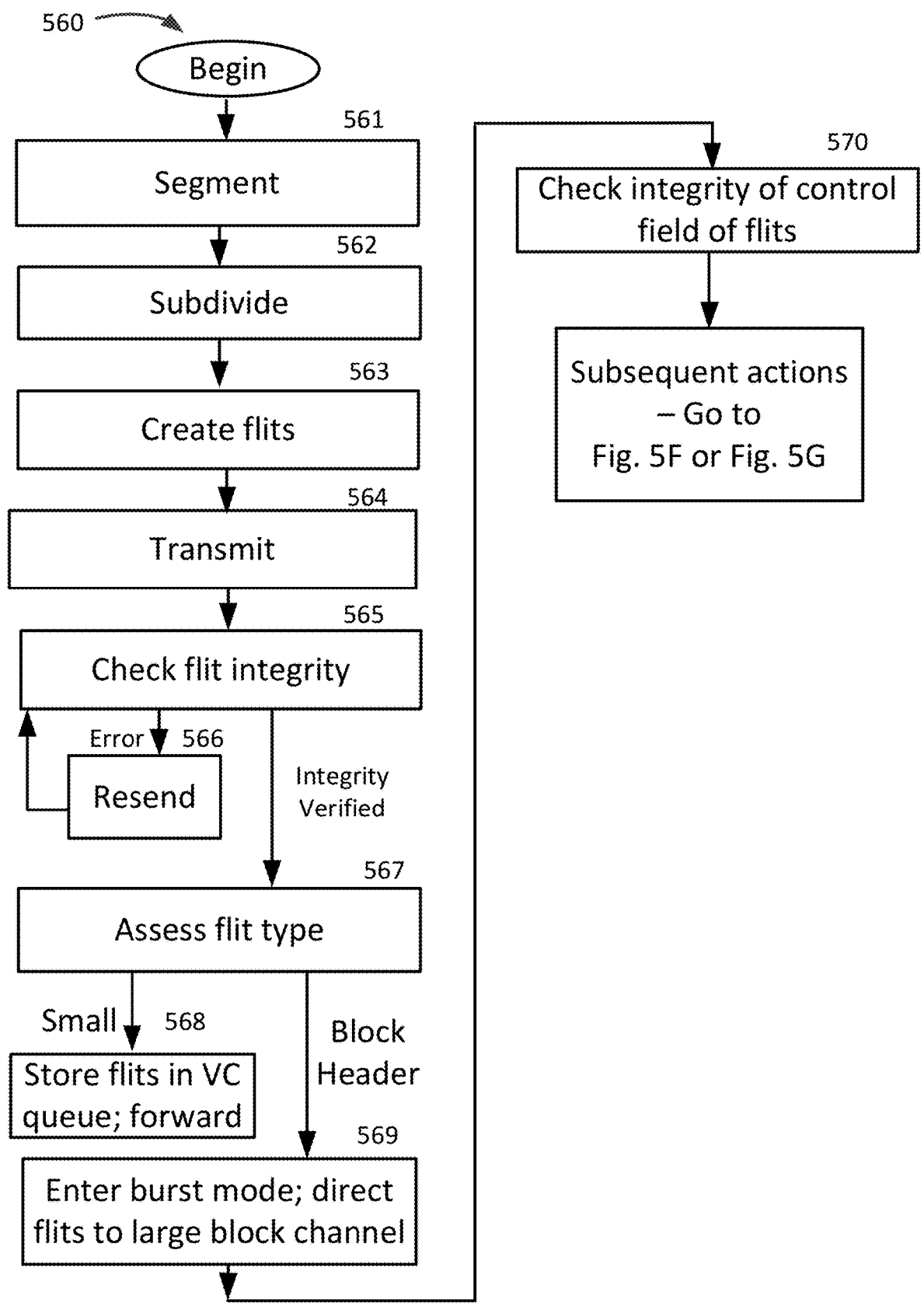
Figure 5F:
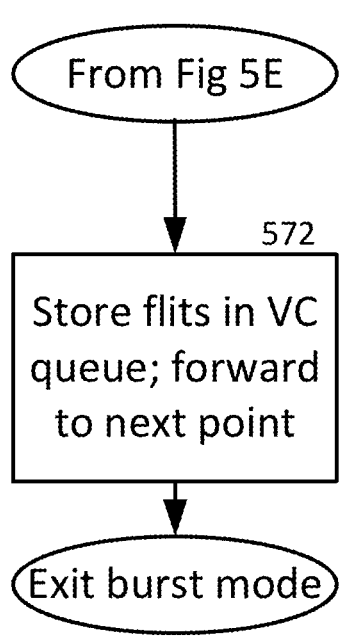
Figure 5G:
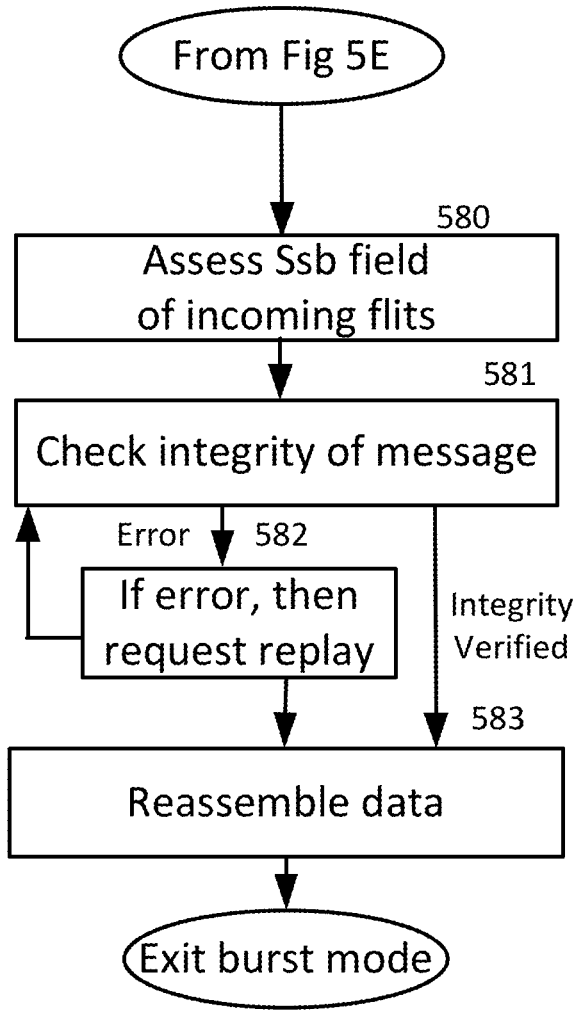

A method 560 for transmitting a packet in burst mode is schematically illustrated in FIGS. 5E-5G, with reference to a transmitter 710, receiver 730, and communications link 457 as schematically illustrated in FIG. 7A. Finite State Machines (FSM) at the transmitter 710 and receiver 730 control the switch between flit formats.

The method 560 may be different at an intermediate point (e.g., 542) than at a terminus 459, as explained below.

In this embodiment, bit errors in latency format (e.g., flits 520) are corrected at the link (457) by sending a resend request (458A) from one intermediate point (e.g., 453) to its preceding intermediate point (e.g., 452), and errors that occur in bandwidth format (e.g., flits 530) are corrected with end-to-end (i.e., from originator 451 to terminus 459) replay in response to a replay request 458B. The resend request 458A and replay request 458B may be sent via the fabric. It can be seen that the contiguous stream runs two protocols simultaneously over one physical fabric, the first protocol being a link-level protocol configured for low-latency messaging, and a the second protocol being an end-to-end protocol configured for high bandwidth.

At step 561, a data block (e.g., data block 400) is segmented into sub-blocks (e.g., 410-416, for example). To illustrate this step in an OSI model context, this data segmenting may be performed at level 4, for example. Other data may optionally be included in each sub-block. If the data block 400 is already of a size that can be sent in a packet (e.g., 423), then the method 560 may skip step 561.

Next, at step 562, each sub-block (e.g., 413) is further segmented or subdivided into smaller micro-blocks of data (e.g., sub-block 413 is segmented into micro-blocks 4231-4235) for transmission by the transmitter 710. To illustrate this step in an OSI model context, this data segmenting may be performed at level 3, for example.

Then, at step 563, the method creates a packet composed of several flits, some of which carry the micro-blocks 4231-4235 as payload. The number of flits depends, in part, on how many micro-blocks 4231-4235 are to be transmitted. Together, the flits constitute a packet to be sent in a contiguous burst 505. When the flits arrive at their destination (terminus 459), their payload data is reassembled into the sub-block (e.g., 413) from which the flits were created. To illustrate this step in an OSI model context, this data segmenting may be performed at level 2, for example.

The first flit to be transmitted is a low latency flit 520, having an Ssb field 521, and a CRC-sb field 522. The Ssb field 521 contains data identifying the flit type (for example, block header flit) and identifying the virtual channel on which the flit travels through the fabric. The CRC-sb field 522 contains a CRC value corresponding to the data in the Ssb field 521, or in some embodiments, for the entire flit. In flit 520, the payload field 523 may carry control data. This low latency flit 520 may be referred-to as the header (or "block header") flit 520 because it defines the start of a contiguous burst 505.

The micro-blocks 4231-4235 are formatted into bandwidth flits 530. Each bandwidth flit 530 has an Ssb field 531 storing data (e.g., in this example, a hexadecimal "F") that indicates that the flit 530 is a bandwidth flit that carries payload data, and a payload field 533 containing a micro-block of the data. As such, a bandwidth flit 530 is similar to a freight car in a train in that it is carries mostly payload. A bandwidth flit 530 may be referred to as a "burst freight" flit, and its payload in payload field 533 may be referred to as "freight payload."

In some embodiments, a null flit 540 may be added. A null flit 540 has an Ssb field 541 storing data (e.g., in this example, a hexadecimal "0") that indicates that the flit 540 is null flit that includes a payload 543—i.e., the payload is not a sub-block of a packet (e.g. 423)—and a CRC-sb field 542 that contains a CRC value corresponding to the data in the Ssb field 541, or in some embodiments for the entire flit. In some embodiments, the payload 543 of a null packet 540 may be all zeros, in which case the null packet is simply discarded, and not processed or forwarded by a receiver that receives it. In some embodiments the payload 543 of a null packet 540 may include data that is not part of the data block 400 (which may be referred to as "ancillary data"), in which case the large block processor 741 directs the reception module 731 to redirect the null packet 540 to the small block processor 751 by issuing a null redirect signal 747.

It should be noted that the bandwidth flit 530 does not contain a CRC field having a CRC value for its payload data (i.e., there is no CRCpl field). One consequence of this format is that the payload data (e.g., 533) in each such flit (e.g., 530) cannot be individually verified or corrected at the link level. On the other hand, the omission of such a CRC value leaves room within the flit (530), which room is used to carry payload data. This increases the efficiency of the flit (530) and the packet efficiency of the burst 505.

A tail flit signals the end of a burst 505, and uses the efficient flit format.

The following tables summarize the contents of the various fields of the foregoing flit formats. Table 5A summarizes the various types of flits. Table 5B summarizes the content of the fields for flit 520 of FIG. 5B; Table 5C summarizes the content of the fields for flit 530 of FIG. 5C; and Table 5D summarizes the content of the fields for flit 540 of FIG. 5D.

TABLE 5A

Flits and Formats

| Flit | Format |
|---|---|
| Header | Low-latency |
| Freight | Efficient (or "bandwidth") |
| Null | Null |
| Tail | Efficient (or "bandwidth") |

TABLE 5B

Low-Latency Flit

| Field | Data |
|---|---|
| Ssb (521) | Data identifying the flit type and identifying the virtual channel; length (number of flits) of burst. |
| CRC-sb (522) | CRC value for the sideband field (521) or the entire flit (521, 522 and 523) |
| Payload (523) | Control data |

TABLE 5C

Efficient Flit

| Field | Data |
|---|---|
| Ssb (531) | Data identifying the flit as a bandwidth (or "freight") flit. |
| Payload (533) | Freight data |

TABLE 5D

Null Flit

| Field | Data |
|---|---|
| Ssb (541) | Data identifying the flit as a Null flit. |
| CRC-sb (542) | CRC value for the data in the Ssb field (542); optionally may include a CRC value for the entire flit |
| Null (543) | Null data; or ancillary data |

At step 564, a transmission module 711 at the transmitter 710 puts the flits onto the communications link 457, which delivers the flits (520; 530; 540; 550) to a reception module 731 at the receiver 730. To illustrate this step in an OSI model context, this data segmenting may be performed at level 1, for example.

The receiver 730 may be at an intermediate point in a fabric (e.g., intermediate point 452) or at a terminus (459). The flits form the burst 505 and are sent in a contiguous stream or "burst" 505, which may be described as a "large block."

At the receiver 730, the reception module 731 performs initial processing on the incoming flits. At step 565, the reception module 731 checks the integrity of each received flit. For example, the reception module 731 may check the integrity of the flit by checking the integrity of the data in the Ssb field 521 using the CRC value in the CRCsb field 522. The reception module 731 may be referred to as a "decider" (or "D") because it determines whether a flit is forwarded, and/or how a received flit moves through the receiver 730.

If an error is detected at step 565 (i.e., the integrity is not confirmed), the receiver 730 suspends operation and sends a resend request 458A to the transmission module 711 at step 566, and the transmission module 711 responds by resending the flit. The step of checking the integrity of a flit (step 565) and requesting resend of the flit (step 566) may repeat or loop several times until the flit is sent and its integrity is confirmed. The receiver 730 resumes operation upon receipt of the retransmitted and previously failed flit.

If the integrity of a received flit is confirmed at step 565, then the reception module 731 decodes the Ssb field 521 of the flit to assess the type of the flit at step 567. When the receiver 730 is not in burst mode (as described further below), the flits arriving at the receive 730 may be in either of two types: a small flit, and a flit that is a header flit 520. If the flit is a small flit, then the method sends the flit to a virtual channel queue, at step 568.

However, if the flit is a header flit 520 of a burst 505, then the reception module puts the receiver 730 is put into burst mode, in which all subsequent flits (530; 540; 550) of the burst 505 are automatically directed to the large block processor 741 in the large block branch 740 of the receiver 730 at step 569. More specifically, the reception module 731 directs the subsequent flits that follow the header flit 520 (i.e., flits 530; 540; 550) to the control field verification module 742 in the large block processor 741.

In the large block processor 741, the control field verification module 742 checks the integrity each received flit (flits 530; 540; 550) at step 570. Two legal encodings are defined, one for active payload (e.g., in a freight flit 530 or tail flit 540) and one for null data (e.g., in a null flit 540).

The method then executes subsequent actions which actions depend on whether the receiver is at an intermediate point (e.g., 542) or is at a terminus (e.g., 459) for the burst 505. Those subsequent actions are schematically illustrated in FIG. 5F and FIG. 5G.

Burst Mode at an Intermediate Point

If the receiver is at an intermediate point (e.g., 542) and if the control field integrity is verified, and the flit is interpreted as an efficient (or "bandwidth" or "freight") flit (530), then the flit 530 is forwarded to a virtual channel queue, from which it is sent across a link 457 to the next destination on route to the terminus 459, (e.g., via multiplexors 774; 754; and 732) as step 572, which is schematically illustrated in FIG. 5F. Once all the flits in the burst 505 have been received and placed into a VC queue ((except null flits which are not forwarded), the receiver 730 exits burst mode.

Burst Mode at a Terminus

If the receiver 730 is at a terminus 459 (e.g., as schematically illustrated in FIG. 4B), the method assesses the Ssb data of each flit, at step 580, until a tail flit 550 is received and identified.

Then the integrity of the entire burst 505 is then checked at step 581 using the End-To-End CRC value in the tail flit 540. If the integrity of the entire burst 505 is not verified, then the terminus 459 requests that the entire packet be replayed from the originator 451, via a replay request 458B, at step 582. The integrity check of step 581 and the replay at step 582 may repeat or loop several times until the integrity of the packet is verified.

When the integrity of the entire packet 505 is verified, then the terminus 459 reassembles the sub-block (e.g., 413) from the payload data of the flits that compose the packet, at step 583. When a flit is identified as a tail flit 550, a resume signal 745 is sent to the reception module 731, and the receiver 730 exits burst mode.

Via the method 560, a contiguous burst 505 may be transmitted from an originator 451 to a terminus 459 with very high packet efficiency and low latency. Since the burst 505 has only one head flit 520 and one tail flit 550, and may have as few as zero null flits 540, the entire burst 505 carries very little overhead and carries mostly data micro-blocks. Consequently, a packet sent in burst mode may have a packet efficiency of ninety percent (90%), ninety-five percent (95%) or higher. For example, in some embodiments, a packet sent in burst mode may have a packet efficiency of 96%, 97%, 98% or even 99%.

Also, a packet sent in burst mode may have a bit efficiency of ninety percent (90%), ninety-five percent (95%), or even 96%, 97%, 98% or even 99%. As just one example, if a packet has a total of 10 flits, including 1 header flit (152 bits, of which 24 bits are overhead, including 8 sideband bits and 16 CRC bits, and 128 bits are payload), and 9 bandwidth flits (152 bits, of which 4 bits are overhead sideband bits and 148 bits are payload bits), then the bit efficiency would be $(1520-60)/1520 \times 100\% = 96\%$.

Interleaved Mode

In another embodiment, a data sub-block (e.g. 413) is sent as a packet composed of several flits, in an interleaved mode. The packet includes flits having at least two different formats. The transmission of the packet runs two protocols simultaneously over one physical fabric, the first protocol being a link-level protocol configured for low-latency messaging, and a the second protocol being an end-to-end protocol configured for high bandwidth. Aspects of this embodiment are schematically illustrated in FIGS. 6A-6F, and may be understood in the context of the transmitter 710, receiver 730, and communications link 457 as schematically illustrated in FIG. 7B.

Figures 6A, 6B, 6C:
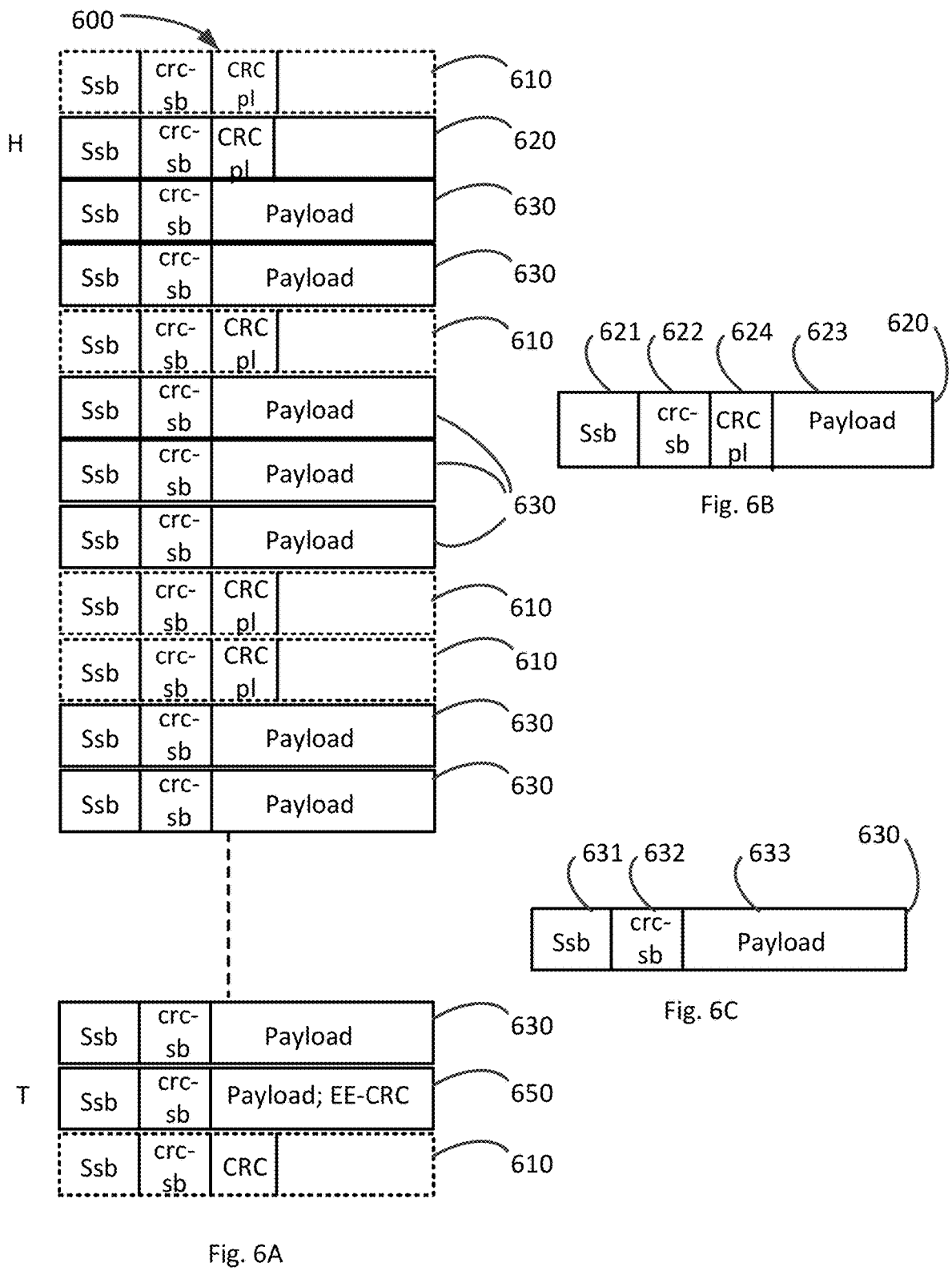
FIGS. 6A-6F schematically illustrate features of another embodiment of a method for transmitting data in an interleaved mode.

Generally, in this embodiment, flits in both low latency format FIG. 6B and efficient format [FIG. 6C] carry a little-CRC field (Ssb-pl). Little-CRC (Ssb-pl) includes a CRC value that protects the system sideband (Ssb) field, and generates replays at the link level if a transient error occurs within Ssb.

For each flit, if the integrity of the flit's Ssb data is verified, the flit's Ssb field is decoded to determine its flit type, virtual channel, and flit format. If a flit decodes to a low latency format, the big-CRC field (CRC-pl) protects payload data. Efficient flits omit the big-CRC field (CRC-pl) and re-purpose the space (i.e., bits within the flit) that would have been occupied by that field into user payload data. Consequently, the efficient flit format allows more data per flit than other format, and use of an efficient flit within a packet allows relatively higher data throughput than for example, a packet that uses flits with more overhead (e.g., CRC) fields. Errors in user data are detected and replayed end-to-end.

In this embodiment, a block of data 413 is transmitted from a transmitter 710 through a link 457 to a receiver 730 by sending micro-blocks of data in several data flits. The flits may be, but are not required to be, sent in a continuous stream. The flits are not of uniform format, in that some flits have a first format (e.g., a "low latency format;" FIG. 6B) and a second format (e.g., an "efficient format" or "bandwidth" format" FIG. 6C).

Figure 6D:
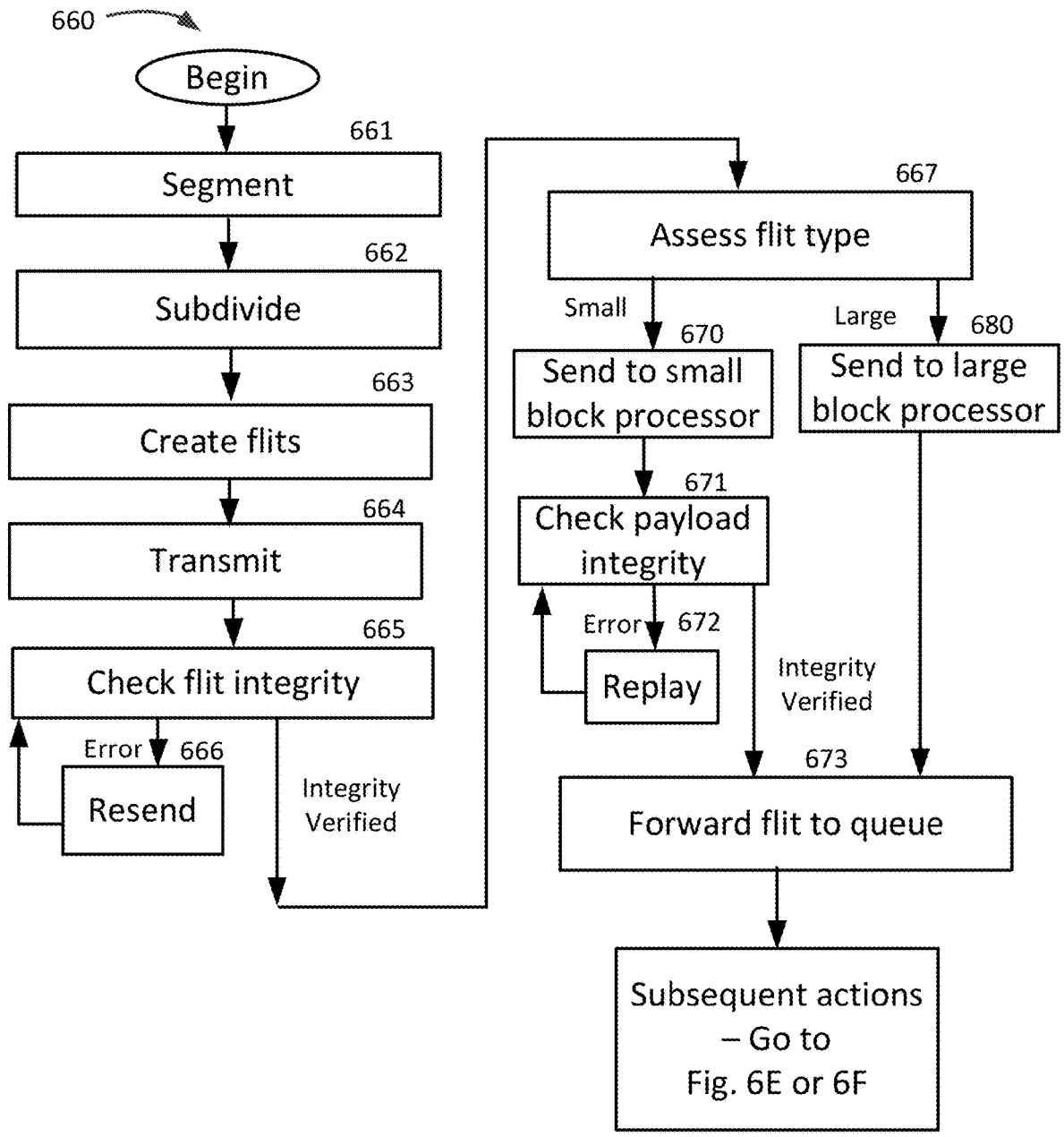

A method 660 for transmitting a packet in interleaved mode is schematically illustrated in FIG. 6D, with reference to a transmitter 710, receiver 730, and communications link 457 as schematically illustrated in FIG. 7B. Finite State Machines (FSM) at the transmitter 710 and receiver 730 control the switch between flit formats.

At step 661, a data block (e.g., data block 400) is segmented into sub-blocks (e.g., 410-416, for example). To illustrate this step in an OSI model context, this data segmenting may be performed at level 4, for example. Other data may optionally be included in each sub-block. If the data block 400 is already of a size that can be sent in a packet (e.g., 423), then the method 660 may skip step 661.

Next, at step 662, each sub-block (e.g., 413) is further segmented or subdivided into smaller micro-blocks of data (e.g., sub-block 423 is segmented into micro-blocks 4231-4235) for transmission by the transmitter 710. To illustrate this step in an OSI model context, this data segmenting may be performed at level 3, for example.

Then, at step 663, the method creates a packet (for example, 423) composed of several flits, some of which carry the micro-blocks 4231-4235 as payload. The number of flits depends, in part, on how many micro-blocks 4231-4235 are to be transmitted. Together, the flits constitute the packet. When the flits arrive at their destination (terminus 459), their payload data is reassembled into the sub-block (e.g., 413) from which the flits were created. To illustrate this step in an OSI model context, this data segmenting may be performed at level 2, for example.

The first flit is a low latency flit 620, having an Ssb field 621, and a CRC-sb field 622, a CRC-pl field 624, and a payload field 623 (e.g., FIG. 6B). The Ssb field 621 contains data identifying the flit type and the virtual channel on which the flist travels through the fabric, and the CRC-sb field 622 contains a CRC value corresponding to the data in the Ssb field 621. Similarly, the payload field 623 contains data (e.g., from data block 400; micro-blocks 4231-4235), and the CRC-pl field 624 contains a CRC value corresponding to the data in the payload field 623. This low latency flit 620 may be referred-to as the "header flit" because it defines the start of a packet composed of several flits. The length of a low-latency flit 620 may be determined by the system designer, so the following are merely examples, and do not limit the disclosure or claims. In this embodiment, the low-latency flit 620 has a total length of 160 bits: the Ssb field (621) occupies 8 bits, the crc-sb field (622) occupies 8 bits, the CRC-pl field (624) occupies 16 bits, and the payload field (623) occupies 128 bits.

The micro-blocks 4231-4235 are formatted into bandwidth flits 630 (FIG. 6C). Each bandwidth flit 630 has an Ssb field 631 storing data indicates that the flit 630 carries payload data, a CRC-sb field 631 which contains a CRC value corresponding to the data in the Ssb field 631. Each bandwidth flit 630 also has a payload field 633 containing a micro-block (e.g., 4231-4235) of the data. As such, a bandwidth flit 630 is similar to a freight car in a train in that it is full of payload, and may be referred to as an "interleaving freight" flit. The length of a bandwidth flit 630 may be determined by the system designer, so the following are merely examples, and do not limit the disclosure or claims. In this embodiment, the bandwidth flit 630 has a total length of 160 bits: the Ssb field (631) occupies 8 bits, the crc-sb field (632) occupies 8 bits, and the payload field (623) occupies 144 bits.

The packet ends with a tail flit 650. A tail flit 650 has the same format as a bandwidth flit (630), but its payload 633 includes an end-to-end CRC value for the entire packet (i.e., the entire collection of flits 620, 630 and 650), but not for any interleaved data flits 610.

It should be noted that the bandwidth flit 630 does not contain a CRC field having a CRC value for its payload data. One consequence of this format is that the payload data 633 in each such flit 630 cannot be individually verified or corrected at the link level. On the other hand, the omission of such a CRC value leaves room within the bandwidth flit (630) that is used to carry payload data. This increases the efficiency of the bandwidth flit (630) and the packet efficiency of the interleaved packet.

The following tables summarize the contents of the various fields of the foregoing flit formats. Table 6A summarizes the types of flits. Table 6B summarizes the content of the fields for flit 620 of FIG. 6B; and Table 6C summarizes the content of the fields for flit 630 of FIG. 6C.

TABLE 6A

| Flits and Formats | |
|---|---|
| Flit | Format |
| Header (620) | Low-latency |
| Bandwidth (630) | Efficient (or "bandwidth") |
| Tail (650) | Efficient (or "bandwidth") |

TABLE 6B

| Field | Data |
|---|---|
| Ssb (621) | Data identifying the flit type and identifying the virtual channel. |
| CRC-sb (622) | CRC value for the data in the Ssb field (621). |
| CRC-pl (624) | CRC value for the data in the payload field (623). |
| Payload (623) | Control data |

TABLE 6C

| Field | Data |
|---|---|
| Ssb (631) | Data identifying the flit type and identifying the virtual channel. |
| CRC-sb (622) | CRC value for the data in the Ssb field (623). |
| Payload (633) | Payload data; in a tail flit (650): EE-CRC value |

At step 664, a transmission module 711 at the transmitter 710 puts the flits onto the communications link 457, which delivers the flits to a reception module 731 at the receiver 730 over a virtual channel (e.g., 460). To illustrate this step in an OSI model context, this data segmenting may be performed at level 1, for example. The flits of the packet may be sent interleaved with other flits that are not part of the packet. For example, flit 610 in between two flits 630 in FIG. 6A.

The reception module 731 of the receiver 730 performs initial processing on the incoming flits. At step 665, the reception module 731 checks the integrity of the Ssb data with the value of the CRC-sb field (621; 631).

If, in step 664, an error is detected in the Ssb field (621; 631), the receiver 730 suspends operation and sends a resend request 458A to the transmission module 711 at step 666. Consequently, it can be seen that this flit is sent with a link-level protocol. For each flit, the integrity check (step 665) and resend (step 666) may repeat or loop until the flit is received at the receiver 730 and its integrity is confirmed. The receiver 730 resumes operation upon receipt of the retransmitted and previously failed flit.

At step 667, the method decodes the Ssb field (i.e., 621; 631) and uses that data to assess each flit to determine whether it is a low-latency flit, and whether the flit is a tail flit 650 representing the end of a packet.

If in step 667 it is determined that the flit is a low-latency flit (e.g., a flit 620), then the flit is sent to the small block processor 751. Next, the integrity of the payload fields (623) of small block flit (620) is checked by the CRC value in the CRC-pl field (624) in module 752 of the small block processor 751 at step 671.

If in step 671 an error is detected in the {big-CRC, payload} field the small flit processor 751 sends a replay request 755 to the transmission module 711. Consequently, it can be seen that this flit is sent with a link-level protocol. The receiver 730 resumes operation upon receipt of the retransmitted and previously failed flit.

If in step 671 the integrity of the {big-CRC, payload} field is verified the flit is forwarded to the appropriate VC queue at step 673

Returning to step 667, if it is determined that a flit 630 is an efficient flit, then the portion of the flit that would otherwise have held a CRC-pl field 624 (e.g., if the flit were a header flit 620) is all interpreted as payload 633 and forwarded to the appropriate VC queue at step 673.

The method then executes subsequent actions which actions depend on whether the receiver is at an intermediate point (e.g., 542) or is at a terminus (e.g., 459) for the packet 423. Those subsequent actions are schematically illustrated in FIG. 6E and FIG. 6F.

Interleaved Mode at an Intermediate Point

Figure 6E:
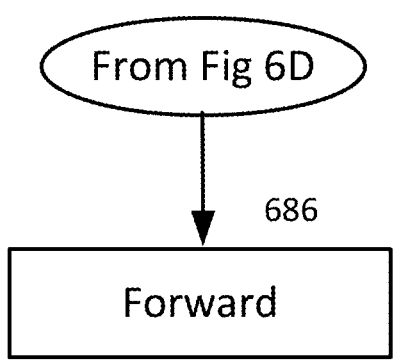
Figure 6F:
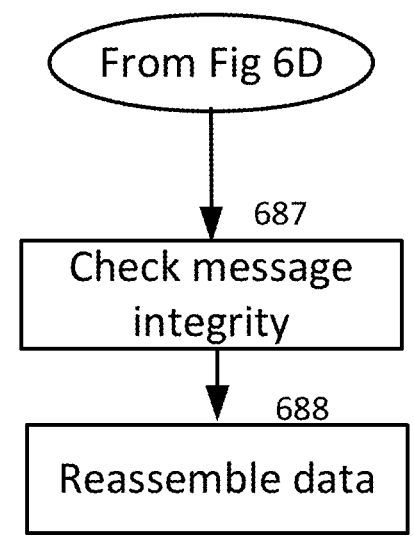

If the receiver 730 is at an intermediate point (e.g., 452), then the VC queue sends each packet to the next point (e.g., 453) on the virtual channel 460, at step 686 (e.g., via multiplexors 774; 754; and 732), as schematically illustrated in FIG. 6E.

Interleaved Mode at a Terminus

If the receiver 730 is at the terminus (e.g., 459), and if the receiver has received a tail flit 650, then the receiver 730 checks the integrity of the entire packet, using the EE-CRC value in the tail flit 650, at step 687, and requests that the entire packet be resent via a replay message 458B (i.e., implementing an end-to-end protocol) if the integrity of the packet is not confirmed. When the entire packet has been received, the method 660 reassembles the data 413 from the payload content of the flits at step 688 as schematically illustrated in FIG. 6F. It can be seen that the transmission of the packet runs two protocols simultaneously over one physical fabric, the first protocol being a link-level protocol configured for low-latency messaging, and a the second protocol being an end-to-end protocol configured for high bandwidth.

Via the process 660, a data block 400 may be transmitted from a transmitter to a receiver with both very high packet efficiency and low latency. Since the interleaved transmission has only one head flit 620 and many interleaved freight flits 630, the entire packet carries very little overhead and is mostly data micro-blocks. Consequently, a packet sent in interleaved mode may have a packet efficiency of ninety percent (90%), ninety-five percent (95%) or higher. For example, in some embodiments, a packet sent in interleaved mode may have a packet efficiency of 96%, 97%, 98% or even 99%.

Also, a packet sent in interleaved mode may have a bit efficiency of eighty nine percent (89%), ninety percent (90%), ninety-five percent (95%) or even 96%, 97%, 98% or even 99%. As just one example, if a packet has a total of 10 flits, including 1 low-latency flit (160 bits, of which 32 bits are overhead sideband bits and CRC bits, and 128 bits are payload), and 9 bandwidth flits (160 bits, of which 16 bits are overhead sideband bits and CRC bits, and 148 bits are payload bits), then the bit efficiency would be (1600−176)/1600×100%=89%.

Dual-Mode Modulation

As described above, various methods of transmitting data send streams of flits. The inventors have discovered that a given, single flit may be transmitted using multiple a modulation protocols. For example, FIG. 8A schematically illustrates transmission of a flit (e.g., flit 530) in which a portion of the flit is transmitted using a low-order modulation, and another portion of the flit is transmitted using a higher-order modulation. FIG. 8B schematically illustrates a method of dual-mode modulation of bits within a single flit.

In the example 800 of FIG. 8A, a transmitter 810 transmits a first part of the flit using binary modulation 820 (e.g., in this example, NRZ modulation; step 851): a given bit can assume one of only two values at any given time: 11 (logic high) or 00 (logic low). The part of the flit may be the sideband data or CRC data, for example (e.g., sideband field 531 of flit 530, or sideband file d631 and crc-sb field 632 of flit 630, to take just two examples), since the binary modulation maybe more robust and more reliable (e.g., less susceptible to noise) than a higher-order modulation.

Continuing with the example 800 of FIG. 8A, a transmitter 810 transmits a second part of the flit (for example, the remainder of the flit after the CRC value) using a higher-order modulation 830 (e.g., in this example, PAM4 modulation step 852). In this embodiment, a given bit can assume any of four values at any given time: 00 (two bits of data, both logic low), 01 (two bits of data, one logic low and one logic high), 10 (two bits of data, one logic high and one logic low), and 11 (two bits of data, both logic high). Consequently, the higher-order modulation can, desirably, carry twice as much data (e.g., two bits per cycle of clock 840) than the NRZ module (e.g., one bit per cycle of clock 840). The higher-order modulation may be less robust or less reliable (e.g., more sensitive to noise) than the lower-order modulation, but that may be acceptable in some systems, since the data in that portion of the flit (e.g., payload data) can be re-sent if its integrity is not verified (e.g., by the CRC data). After transmitting a flit, the method 850 may transmit the next flit using the same dual-format modulation (step 853).

Of course, a transmitter (810) and receiver (e.g., 730 from FIG. 7A, FIG. 7B) have hardware configured to operate in both modulation modes, and to switch between modes mid-flit.

The transmitter, when sending an NRZ symbol, transmits either a 11 (for a logic "1") or 00 (for a logic "0"). When sending a PAM4 symbol, the transmitter transmits a 00, 01, 10, or 11, as described above and shown in FIG. 8A.

In some embodiments, all the bits in each flit are serialized and transmitted in a defined order. The receiver may determine whether a transmission is NRZ or PAM4 based on symbol counting. As is known in the art of serial data transmission, the receiver may be framed to the incoming serial symbol stream and will decode each received symbol as NRZ or PAM4 based on the cyclo-stationary position of each symbol within the frame.

If the symbol position being decoded is in an NRZ position, then a 00 or 01 decodes to a logic "0" and a 10 or 11 decodes to a logic "1." If the symbol position being decoded is in a PAM4 position, decoding then 00 decodes to two bits, both logic zero, "01" decodes to zero and one, "10" decodes to one and zero, and "11" decodes to two bits, both logic one.

PAM4 detection, or detection of other higher-order modulation methods, may experience higher error rates than NRZ or other lower-order modulation methods, and for that reason may be used in some embodiments only for the payload field of the efficient packets, where the overhead of strong forward error correction and strong CRC, does not represent a significant penalty, and where reliable flit by flit link level detection is not required.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of transmitting data as a packet in a burst mode, from a transmitter in a high-performance computer to a receiver over a communications channel on a single fabric within the high-performance computer, the method comprising:
generating a packet comprising a plurality of flits having different formats, the formats configured to implement different communication protocols, including at least one low-latency flit configured for low latency transmission over the communications channel, and a plurality of bandwidth flits, each bandwidth flit configured for high bandwidth throughput over the same communications channel;
transmitting the plurality of flits over the communications channel from the transmitter to the receiver in a contiguous stream, the contiguous stream running two communication protocols simultaneously over one physical fabric, the first protocol being a link-level protocol configured for low-latency messaging, and the second protocol being an end-to-end protocol configured for high bandwidth; and
at the receiver, reassembling the data from the flits.

2. The method of transmitting data as a packet in a burst mode of claim 1, wherein
at least one low-latency flit is a header flit identifying the beginning of the contiguous burst of flits, and the plurality of bandwidth flits are configured to carry a sub-set of the data, and the packet further comprises:
a tail flit configured to identify the end of the contiguous burst.

3. The method of transmitting data as a packet in a burst mode of claim 2, wherein the header flit includes:
a header sideband field storing meta data identifying the flit as a header flit, and a sideband CRC field having a CRC value corresponding to the sideband meta data.

4. The method of transmitting data as a packet in a burst mode of claim 2, wherein the bandwidth flit format includes a payload field storing the sub-set of the data, and a freight sideband field identifying the flit as a bandwidth flit.

5. The method of transmitting data as a packet in a burst mode of claim 2, wherein the tail flit includes a payload field having an end-to-end CRC value for the packet.

6. The method of transmitting data as a packet in a burst mode of claim 1, further comprising checking flit integrity of at least one flit, at an intermediate point in the communications channel between the transmitter and the receiver, and requesting that the transmitter resend the flit if the flit integrity is not verified.

7. The method of transmitting data as a packet in a burst mode of claim 1, further comprising:
receiving all of the flits at the receiver prior to checking the integrity of the packet; and thereafter checking the integrity of the packet at the receiver.

8. The method of transmitting data as a packet in a burst mode of claim 7, further comprising requesting a replay of the entire message from the transmitter, if the integrity of the packet is not confirmed.

9. The method of transmitting data as a packet in a burst mode of claim 1, wherein the transmitted packet has a packet efficiency of greater than ninety percent.

10. The method of transmitting data as a packet in a burst mode of claim 1, wherein the transmitted packet has a packet efficiency of greater than ninety five percent.

11. The method of transmitting data as a packet in a burst mode of claim 1, wherein transmitting the plurality of flits from the transmitter to the receiver in a contiguous stream comprises transmitting the plurality of flits over a single virtual channel.

12. A method of transmitting data in an interleaving mode, from a transmitter in a high-performance computer to a receiver within the high-performance computer over a communications channel within the high-performance computer, the method comprising:
generating a packet comprising a plurality of packet flits having different formats, the formats configured to implement different communication protocols, including at least one low-latency flit configured for low latency transmission over the communications channel, and a plurality of bandwidth flits, each bandwidth flit configured for high bandwidth throughput;
transmitting the plurality of flits from the transmitter to the receiver in a non-contiguous stream, such that the plurality of packet flits are interleaved with additional flits, which additional flits are not part of the packet, the transmission of the packet running two protocols simultaneously over one physical fabric, the first protocol being a link-level protocol configured for low-latency messaging, and the second protocol being an end-to-end protocol configured for high bandwidth; and at the receiver, reassembling the data from the packet flits.

13. The method of transmitting data in an interleaving mode of claim 12, wherein the step of generating a packet comprises:

generating a header flit having:
- a header sideband field storing meta data about the data block;
- a header sideband CRC field having a CRC value corresponding to the data in the sideband field;
- a payload field;
- a header payload CRC field having a CRC value corresponding to the data in the payload field;

generating a plurality of freight flits, each freight flit having:
- a payload field storing one of the sub-blocks;
- a freight sideband field identifying the flits as a freight flit;
- a freight sideband CRC field having a CRC value corresponding to the data in the freight sideband field; and generating a tail flit having a tail payload field and an end-to-end CRC field, the end-to-end CRC field storing a CRC value for the packet.

14. The method of transmitting data in an interleaving mode of claim 13, wherein transmitting the plurality of flits from the transmitter to the receiver comprises transmitting the plurality of flits over a single virtual channel.

15. The method of transmitting data in an interleaving mode of claim 12, wherein the transmitted packet has a packet efficiency of greater than ninety percent.

16. The method of transmitting data in an interleaving mode of claim 12, wherein the transmitted packet has a packet efficiency of greater than ninety five percent.

17. The method of transmitting data as a packet in a burst mode of claim 1, wherein transmitting a bandwidth flit includes transmitting bits of a first part of the flit using a binary modulation format, and transmitting the remaining bits of the flit using a higher-order modulation format.

18. A system for transmitting data over a virtual channel in a manner having both low latency and high efficiency, the system comprising:

a transmitter configured to generate a packet comprising a plurality of flits having different formats, the formats configured to implement different communication protocols, including at least one low-latency flit configured for low latency transmission over the communications channel, and a plurality of bandwidth flits, each bandwidth flit configured for high bandwidth throughput, the transmitter configured to transmit the plurality of flits via a communications channel by running two protocols simultaneously over one physical fabric, the first protocol being a link-level protocol configured for low-latency messaging, and the second protocol being an end-to-end protocol configured for high bandwidth; and a destination receiver configured to receive the plurality of flits and validate the integrity of the packet as received at the receiver.

19. The system for transmitting data over a virtual channel of claim 18, wherein the communication channel comprises an intermediate point, the intermediate point having an intermediate receiver configured to validate the integrity of some, but not all, of the flits of the packet.

20. The system for transmitting data over a virtual channel of claim 18, wherein the transmitter is configured to transmit all of the flits of the packet in a contiguous burst.

21. The system for transmitting data over a virtual channel of claim 18 wherein the transmitter is configured to transmit all of the flits of the packet interleaved with other flits that are not part of the packet.

22. The system for transmitting data over a virtual channel of claim 18 wherein the transmitter is configured to transmit a first part of a bandwidth flit using NRZ modulation, and transmits the remainder of the bandwidth flit using higher order modulation using PAM modulation.

* * * * *